United States Patent
Kowalski

(10) Patent No.: US 11,876,418 B2
(45) Date of Patent: Jan. 16, 2024

(54) BLOCKING ELEMENT FOR ROTOR WINDING HEADS ON TURBOGENERATORS WITH ROTOR CAP WITH RADIAL VENTILATION BORES

(71) Applicant: Siemens Energy Global GmbH & Co. KG, Bayern (DE)

(72) Inventor: Matthias Kowalski, Mulheim an der Ruhr (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 360 days.

(21) Appl. No.: 17/278,456

(22) PCT Filed: Sep. 25, 2019

(86) PCT No.: PCT/EP2019/075809
§ 371 (c)(1),
(2) Date: Mar. 22, 2021

(87) PCT Pub. No.: WO2020/064802
PCT Pub. Date: Apr. 2, 2020

(65) Prior Publication Data
US 2021/0367468 A1  Nov. 25, 2021

(30) Foreign Application Priority Data
Sep. 27, 2018 (DE) ............... 10 2018 216 586.6

(51) Int. Cl.
*H02K 3/24* (2006.01)
*H02K 3/51* (2006.01)
(Continued)

(52) U.S. Cl.
CPC ............ *H02K 3/24* (2013.01); *H02K 3/51* (2013.01); *H02K 7/1823* (2013.01); *H02K 9/10* (2013.01)

(58) Field of Classification Search
CPC .......... H02K 3/24; H02K 3/51; H02K 7/1823; H02K 9/10; H02K 3/5055
See application file for complete search history.

(56) References Cited

U.S. PATENT DOCUMENTS

| 3,504,207 A | 3/1970 | Tjernstrom |
| 4,363,982 A | 12/1982 | Kaminski |

(Continued)

FOREIGN PATENT DOCUMENTS

| CH | 334085 A | 11/1958 |
| DE | 1016821 B | 10/1957 |

(Continued)

OTHER PUBLICATIONS

JPS5765237A_translate (Year: 1984).*

(Continued)

*Primary Examiner* — Tulsidas C Patel
*Assistant Examiner* — Mohammed Ahmed Qureshi
(74) *Attorney, Agent, or Firm* — Wolter Van Dyke Davis, PLLC

(57) ABSTRACT

A blocking element for a rotor head winding of a turbogenerator has a form which is adapted to the contour of the adjacent conductor of the rotor head winding. A depression extending in the axial direction is made in the side of the blocking element facing the conductor, which depression forms a serpentine channel for a cooling fluid from an inlet port on the small radius to a discharge port on the highest radius, with the discharge port communicating with a ventilation bore of the rotor cap enclosing the rotor winding head. An improved cooling effect with a reduced flow of cooling fluid and an increase in the efficiency of the turbogenerator as a whole results.

9 Claims, 1 Drawing Sheet

(51) Int. Cl.
*H02K 9/10* (2006.01)
*H02K 7/18* (2006.01)

(56) References Cited

U.S. PATENT DOCUMENTS

| | | |
|---|---|---|
| 4,546,279 A | 10/1985 | Hammer |
| 6,087,745 A | 7/2000 | Dreher |
| 6,346,754 B1 | 2/2002 | Kieda |
| 2002/0093253 A1* | 7/2002 | Miller .................... H02K 15/12 |
| 2017/0033633 A1 | 2/2017 | Nagayasu et al. |
| 2017/0110924 A1* | 4/2017 | Groeppel ................ H02K 5/00 |
| 2020/0093253 A1 | 3/2020 | Yoshida |

FOREIGN PATENT DOCUMENTS

| | | | |
|---|---|---|---|
| DE | 1930508 A1 | 8/1970 | |
| DE | 3201057 A1 | 8/1982 | |
| DE | 60213557 T2 | 2/2007 | |
| DE | 102014206010 A1 | 10/2015 | |
| EP | 0160887 A2 | 11/1985 | |
| EP | 2112745 A1 | 10/2009 | |
| EP | 2112746 A1 | 10/2009 | |
| EP | 3174180 A1 | 5/2017 | |
| JP | S5765237 A * | 4/1982 | ............... H02K 3/24 |
| JP | S5765237 A | 4/1982 | |
| JP | 2003189543 A | 7/2003 | |
| WO | 9739513 A1 | 10/1997 | |

OTHER PUBLICATIONS

PCT International Search Report and Written Opinion of International Authority dated Dec. 16, 2019, corresponding to PT International application No. PCT/EP2019/075809.

* cited by examiner

BLOCKING ELEMENT FOR ROTOR WINDING HEADS ON TURBOGENERATORS WITH ROTOR CAP WITH RADIAL VENTILATION BORES

CROSS REFERENCE TO RELATED APPLICATIONS

This application is the US National Stage of International Application No. PCT/EP2019/075809 filed 25 Sep. 2019, and claims the benefit thereof. The International Application claims the benefit of German Application No. DE 10 2018 216 586.6 filed 27 Sep. 2018. All of the applications are incorporated by reference herein in their entirety.

FIELD OF INVENTION

The invention relates to a blocking element for the rotor head winding of a turbogenerator.

BACKGROUND OF INVENTION

The rotating part of a power plant generator is used to generate an excitation field. For this purpose, direct current is applied to the exciter winding accommodated by the rotor. The current flow through the winding (copper, for example) results in the generation of heat. This is reflected in elevated temperatures, which limits the utilizability of the machine. In particular, air-cooled generators with a directly water-cooled stator winding are limited by the temperatures in the rotor winding. This has led to the development of rotor caps which are provided with radial bores.

These now make it possible for the rotor winding head to be cooled convectively by a direct, radially directed flow. This improves the heat dissipation capacity many times over. However, this entails two major disadvantages:

1) The increased volume flow through the rotor cap reduces the volume flow through the groove base channels, which is required to cool the active part of the rotor.

2) The large volume flow which emerges radially from the cap creates a type of barrier toward the air gap inlet, with the result that the stator active part (for example the laminated core) is no longer well cooled.

Although making the radial bores smaller restricts the volume flow and thus reduces the problems described above, the cooling conditions are significantly worse.

SUMMARY OF INVENTION

The problem underlying the invention is to improve the utilizability of a turbogenerator.

The problem is solved by means of an object having the features of the independent claim.

The invention makes use of the insight that the cooling gas is used inefficiently in rotor caps with radial bores.

The invention provides a blocking element for turbogenerators which has an inlet opening (on a small radius) and an outlet opening (on the highest radius). The outlet opening connects to the bore through the rotor cap. The element advantageously has a channel guide which guides the cooling fluid selectively along the heat-generating bodies, for example in a serpentine/meandering manner.

The invention provides a blocking element (glass/plastic) which, through introduced gas guide channels, guides the cooling gas selectively along the components (winding) to be cooled. The element is provided for arrangement between the conductors in the rotor winding head. The example shown relates to placement between the tangential conductors. Use between the axial conductors is likewise possible. Such an element increases the flow resistance, resulting in a reduction in the volume flow and thus solving the problems described above. Furthermore, the flowing gas flow is guided along the winding in an optimum manner, considerably improving the convective cooling per volume flow. One feature of the invention is that the inlet opening of the channel is located at the bottom (on a small radius) and the outlet opening is located at the top (on the highest radius).

Compared to conventional rotor-pumping/thermo-siphon cooling, the heat dissipation capacity improves very significantly (for example by a factor of 2.5) when these elements are used and communicate with radial ventilation bores of the rotor cap.

The use of such perforated rotor caps in conjunction with the presented blocking elements with a channel structure is a way of additionally increasing the performance of turbogenerators both for the new plant business and for the service business.

As explained above, the planned use of these perforated rotor caps is subject to the problem of high volume flow consumption. This is solved by the invention. Consequently, there are two advantages for generators with perforated rotor caps: —better cooling of the rotor active part; —large reduction of the gas barrier at the air gap inlet.

Owing to the comparatively smaller volume flow, the required rotor output is also reduced, resulting in improved efficiency for machines with a perforated rotor cap.

BRIEF DESCRIPTION OF THE DRAWINGS

The invention is explained in greater detail below by means of figures as an exemplary embodiment to an extent necessary for understanding. In this case.

DETAILED DESCRIPTION OF INVENTION

The terms radial, tangential and axial relate to the alignment of the subconductors with respect to the axis of rotation of the rotor.

Blocking elements are inserted into the spaces between subconductors of a rotor winding head and mutually stabilize the subconductors. The subconductors can be provided by tangential conductors or axial conductors. A blocking element may almost completely fill the space spanned between two subconductors. The blocking elements are made of electrically insulating material, such as glass, plastic, synthetic material or ceramic.

Figure 1:
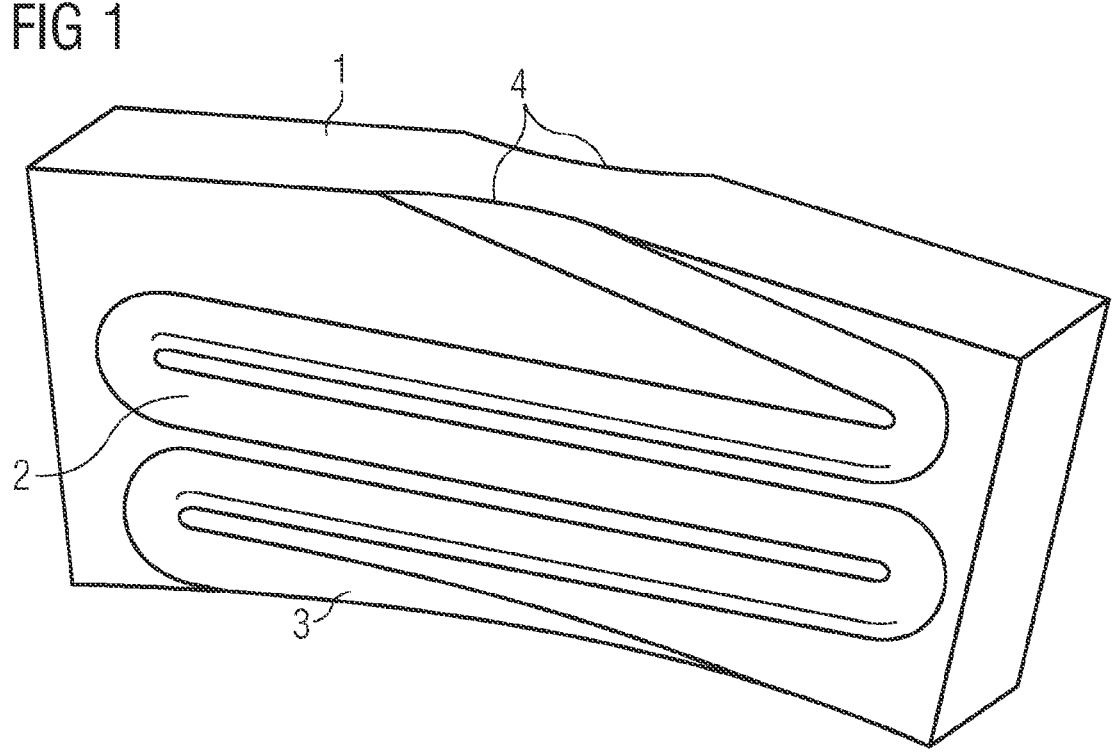
FIG. 1 shows a blocking element 1 according to the invention having a meander-shaped cooling channel 2 on the side facing the tangential conductor.
Figure 2:
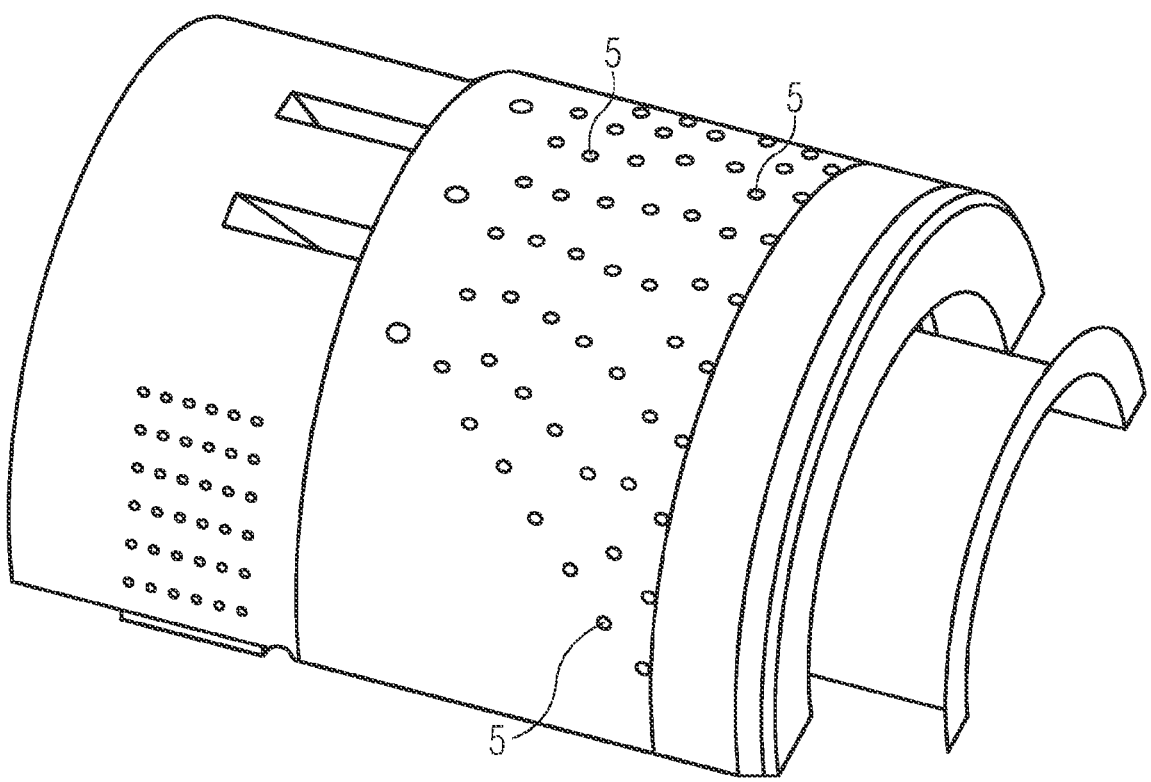
FIG. 2 shows a rotor cap with radial bores 5.

In the embodiment according to FIG. 1, the blocking element has an approximately cuboidal shape and is provided on both sides with a meander-shaped cooling channel structure on the surfaces facing the winding/the subconductors, which hydraulically connects the region above the rotor shaft to the bore in the rotor cap. The cooling channel (the depression) may have a semi-elliptical shape in cross section.

The pumping action (or centrifugal forces), even without the element, conveys the cooling fluid, such as gas, air, hydrogen, radially outward. The additional element performs three tasks: 1) hydraulic connection of the areas of the spaces below the rotor cap (and below the rotor winding head) to the area above the rotor cap (through channels), 2)

restricting the volume flow by increasing the resistance, 3) conducting the volume flow of the cooling fluid to the components to be cooled through cooling channels on the surface of the subconductor/element, said channels being semi-open.

It is easily apparent that significantly less volume flow occurs as a result of the blocking (e.g. only 6%). In comparison with a very common cooling mechanism (no blocking and no bores in the rotor cap), referred to as rotor pumping (also: thermo-siphon), there are marked improvements.

Despite the reduced volume flow, the blocking makes it possible to increase the heat transfer coefficient by more than 2.5 times. Without this invention, the heat transfer coefficient would be as much as 3 times as high, but then almost 20 times the volume flow would be required. This would then have the abovementioned disadvantages.

Possible manufacturing options include not only milling but also printing or other additive processes.

The present invention has been explained in detail for illustrative purposes on the basis of specific exemplary embodiments. Here, elements of the individual exemplary embodiments can also be combined with one another. Therefore, the invention should not be restricted to individual exemplary embodiments but should only be restricted by the appended claims.

REFERENCE SIGNS

1—blocking element
2—depression, channel for cooling fluid
3—inlet on small radius
4—outlet on large radius
5—bore

The invention claimed is:

1. A blocking element configured to be installed in a rotor head winding of a turbogenerator, the blocking element comprising a three-dimensional shape which is matched to a contour of an adjacent subconductor of the rotor head winding,
   wherein when installed in the rotor head winding the blocking element comprises, on a side facing the subconductor, a depression which forms a channel for a cooling fluid from an inlet opening on radially inner side relative to an axis of rotation of the rotor head winding to an outlet opening on a radially outer side relative to the axis of rotation, and
   wherein the outlet opening of the blocking element is configured to be aligned with a hole in a rotor cap that is configured to surround the rotor head winding.

2. The blocking element as claimed in claim 1, wherein the blocking element is configured to be installed in the rotor head winding adjacent a tangential conductor.

3. The blocking element as claimed in claim 1, wherein the blocking element is configured to be installed in the rotor head winding adjacent an axial conductor.

4. The blocking element as claimed in claim 1, wherein the depression is of serpentine configuration.

5. The blocking element as claimed in claim 1, wherein the blocking element is manufactured from glass.

6. The blocking element as claimed in claim 1, wherein the blocking element is manufactured from plastic.

7. The blocking element as claimed in claim 1, wherein the depression has a incurved cross section.

8. The blocking element as claimed in claim 1, further comprising:
   a second side opposite the side facing the subconductor; and
   a second depression in the second side which forms a second channel for the cooling fluid.

9. An apparatus, comprising:
   the blocking element of claim 1; and
   the rotor cap.

* * * * *

UNITED STATES PATENT AND TRADEMARK OFFICE
CERTIFICATE OF CORRECTION

PATENT NO. : 11,876,418 B2  
APPLICATION NO. : 17/278456  
DATED : January 16, 2024  
INVENTOR(S) : Matthias Kowalski Page 1 of 1

It is certified that error appears in the above-identified patent and that said Letters Patent is hereby corrected as shown below:

In the Claims

Claim 1, Column 4, Line 7, before the words "radially inner", insert -- a --;

Claim 7, Column 4, Line 28, remove [incurved], and insert -- curved --.

Signed and Sealed this  
Twenty-seventh Day of February, 2024

Katherine Kelly Vidal  
*Director of the United States Patent and Trademark Office*